March 2, 1943.    C. C. HUNT    2,312,646
STEERING TRAILER
Filed May 16, 1941    2 Sheets-Sheet 1
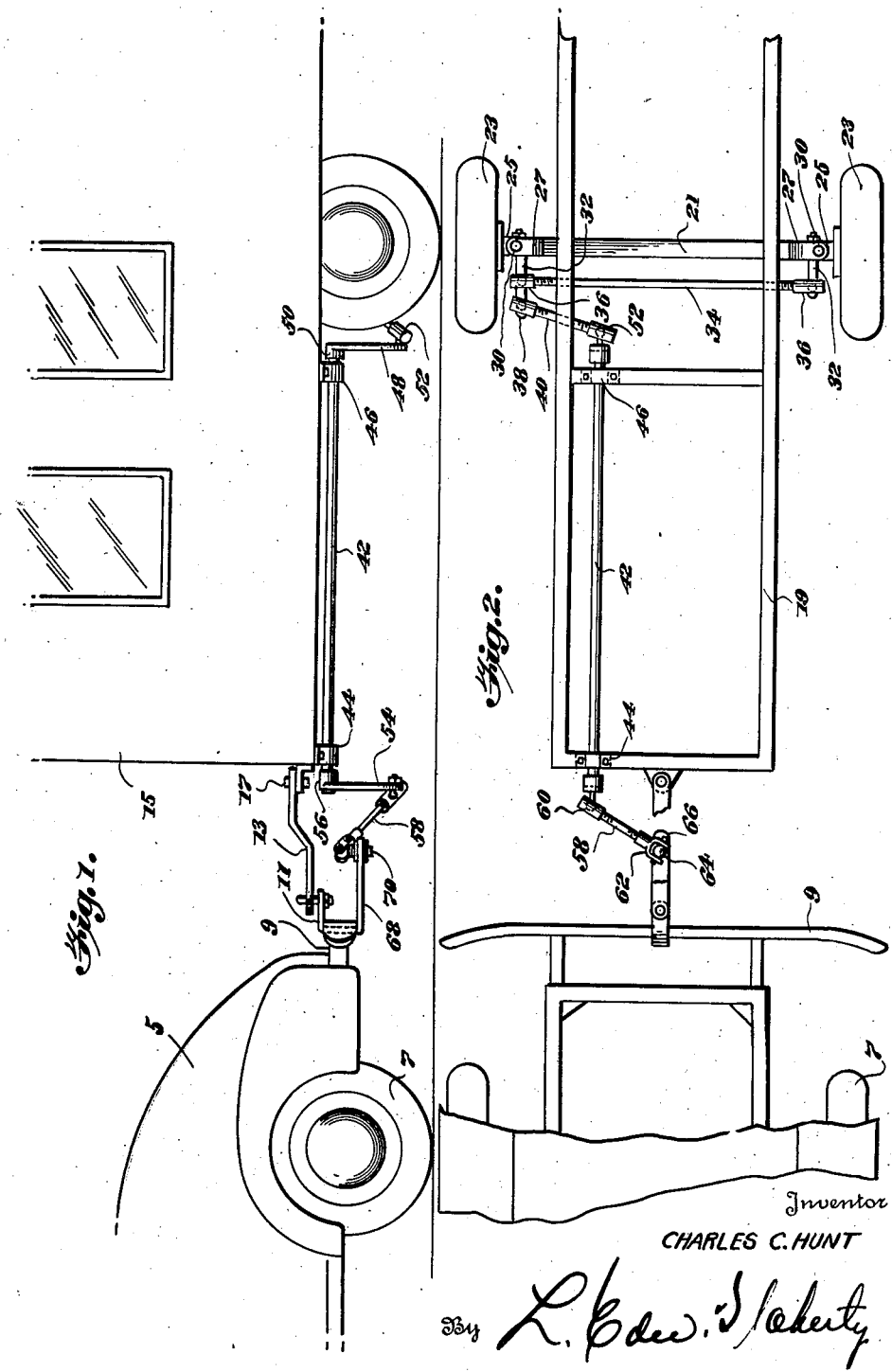
Inventor
CHARLES C. HUNT

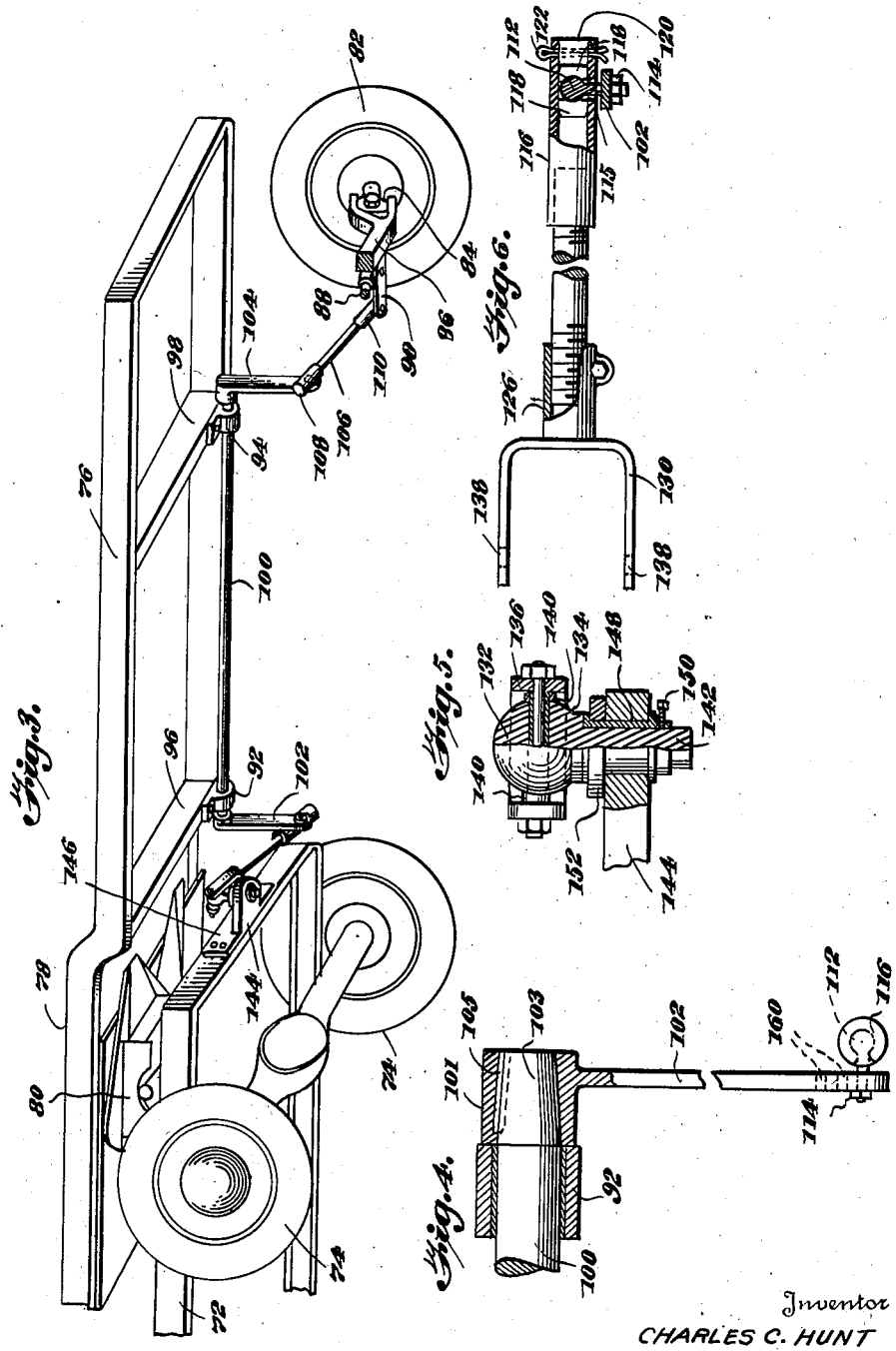
March 2, 1943.  C. C. HUNT  2,312,646
STEERING TRAILER
Filed May 16, 1941  2 Sheets-Sheet 2
Inventor
CHARLES C. HUNT Patented Mar. 2, 1943

2,312,646

UNITED STATES PATENT OFFICE 2,312,646

STEERING TRAILER

Charles Calvin Hunt, Utica, Ohio

Application May 16, 1941, Serial No. 393,830

1 Claim. (Cl. 280—33.55)

The present invention relates to improvements in steering trailers.

The primary object of the invention is to provide a trailer running gear adapted to be coupled with the draft vehicle so that the wheels of the trailer will follow the tracks of the draft vehicle while negotiating turns in a forward direction as well as in reverse while backing.

A further object of the invention is to provide a steering trailer in which the running gear is of the stub axle steering type to decrease the wear of the tires of the steering trailer wheels by eliminating scuffing at the tread of the tires.

A further object of the invention is to provide a steering trailer of the above-mentioned type having a control coupling linkage capable of quick and easy attachment to the draft vehicle without requiring the use of intricate mechanism.

A still further object of the invention is to provide a steering trailer which will relieve stresses and strains on the draft vehicle while turning corners and will prevent the trailer from striking obstructions during turns such as curbs, traffic devices and trees.

Other objects and advantages of the invention will become apparent during the course of the following description of the accompanying drawings wherein:

Figure 1 is a side elevational view of a preferred embodiment of the invention illustrating the same applied to a camping trailer.

Figure 2 is a top elevational view of the same showing the trailer body removed for disclosing the trailer running gear and chassis.

Figure 3 is a perspective view of a modified form of the invention illustrating the same applied to a typical commercial trailer.

Figure 4 is a vertical cross-sectional view of the steering arm employed for coupling the control linkage to the draft vehicle.

Figure 5 is a fragmentary sectional view of the universal connection between the steering arm and draft vehicle and, Figure 6 is an enlarged fragmentary cross-sectional view of the link connecting the steering arm to universal connection.

In the drawings, wherein for the purpose of illustration, and wherein like reference characters will be employed to designate like parts throughout the same, attention is first directed to Figures 1 and 2 wherein the reference character 5 will be employed to generally designate a draft vehicle such as a motor vehicle supported by wheels 7 and having a rear bumper guard 9.

Secured to the rear bumper guard 9 is a U-shaped bracket 11, the upper portion of which provides a trailer coupling for receiving a draft bar 13 pivotally connected to a trailer 15 as at 17.

The trailer 15 comprises suitable running gear including a chassis frame 19 supported by an axle 21 secured thereto and having wheels 23.

The wheels 23 are carried by stub axles 25 mounted in axle forks 27 so that the wheels will turn on the king pins 30. Steering arms 32 are secured to the stub axles 25 and are connected by means of a radius rod 34 the ends of which are secured thereto by ball and socket connections 36.

One of the steering arms 32 is provided with an extension 38 for connection with a drag link 40 adapted to be operatively secured to the steering control linkage carried by the trailer.

Rotatably mounted in the chassis 19 and extending longitudinally thereof is a shaft 42 journaled in bearings 44 and 46 at the opposite ends thereof. The end of the shaft 42 adjacent the journal bearing 46 is provided with a crank arm 48 secured thereto by means of a collar 50 so that the swinging end can be connected to the drag link 40 by means of a ball and socket connection 52.

The opposite end of the shaft 42 is provided with a similar crank arm 54 secured in place by a collar 56 whereby the swinging end of the crank arm can be connected to a control link 58 by a ball and socket joint 60.

Formed on the other end of the control link 58 is a yoke 62 adapted to straddle a spherical connector 64 fastened in position by means of a pivot pin 66.

The spherical connector 64 is secured to the lower leg 68 of the U-shaped bracket 11 by means of a pivoted connection 70. It will thus be seen that turning of the vehicle 5 to the right or left will cause the trailer steering wheels 23 to be moved correspondingly to cause the wheels to follow in the tracks of the vehicle 5 and that short turns can be negotiated with a minimum of exertion and effort.

In the modified form of the invention, as shown in Figures 3 to 6 inclusive, the invention is illustrated as being applied to a truck trailer and includes a draft vehicle such as a truck or the like having a chassis frame 72 supported in the rear by wheels 74. The truck trailer includes a chassis frame 76 having an offset portion 78 extending above the truck chassis 72 and connected therewith by means of a truck trailer coupling 80.

The trailer chassis 76 is supported by wheels 82 mounted on stub axles 84 secured to the ends of a supporting axle 86. The stub axles 84 are connected by means of a radius rod 88 and one of the stub axles is provided with an extension 90 as shown in Fig. 3.

Journaled in bearings 92 and 94 secured to transverse chassis frame bars and extending longitudinally with respect to the chassis 76 is an offset shaft 100 on the ends of which are attached swinging arms 102 and 104 adjacent the respective journal bearings 92 and 94.

The swinging arm 104 is connected to the stub axle steering extension 90 by means of a steering link 106. Ball and socket connections 108 and 110 are provided on the ends of the steering link to reduce friction.

The opposite swinging arm 102 is provided with a ball connector 112 held in place by a nut 114 threaded on the shank thereof. The ball connector extends through an opening 115 in a sleeve 116 in which is located opposed socket members 118. A block 120 closes one end of the sleeve 116 and is locked in place by a cotter key 122.

Threaded in the opposite end of the sleeve 116 is an adjusting link 124 both ends of which are threaded as is clearly shown in Figure 6.

Threaded on the opposite end of the rod 124 is a collar 126 having a locking screw 128 for locking the collar in an adjustant position. A yoke 130 secured to the collar 126 is adapted to straddle a spherical connector 132 having a transverse opening through which extends a bearing sleeve 134. A bolt 136 passes through opposed openings 138 in the yoke and through the sleeve 134 to prevent displacement of the yoke and spacing collars 140 are interposed between the spherical member and yoke to prevent lateral play thereof.

A shank 142 is formed integral with the spherical member and said shank extends through a bracket 144 secured to the truck chassis 72 by means of a base plate 146. Interposed between the bracket 144 and shank 142 is a bearing sleeve 148 locked to the shank 142 by means of a set screw 152 and a washer 152 surrounds the bearing member 148 above the bracket 144 providing a thrust bearing.

As noted in Figure 4, the swinging arm 102 has its collar 101 locked to a tapered portion 103 of the shaft 100 by means of a jib key 105 to insure against rotation of the collar 101 with respect to the shaft 100 and the shank 115 of the spherical member may be adjusted with respect to the swinging arm 102 by inserting it in alternate openings 160.

The operation of the form of the invention shown in Figures 3 to 6 inclusive is similar to that shown in Figures 1 and 2 and it is to be noted that a right or left turn made by the truck will cause the steering wheels 82 to swing to the respective positions so that the trailer wheels will follow the tracks of the draft vehicle.

It is to be understood that the forms of the invention herewith shown and described are to be taken as preferred embodiments of the invention and that various changes in the shape, size and arrangement of parts may be resorted to without departing from the spirit of the invention or the scope of the subjoined claim.

Having thus described the invention, what I claim is:

A trailer and draft vehicle therefor comprising an axle carried by the trailer, wheel supporting stub axles mounted on the ends of the axle carrying wheels, a laterally extending arm connected to each stub axle, a radius rod connecting said laterally extending arms, a shaft journaled in the trailer frame extending longitudinally therefrom, at one side of the trailer, crank arms depending from the ends of said shaft, a link connecting one of the crank arms to one of the laterally extending arms of the stub axles, a U-shaped clamp connected to the rear of the draft vehicle, a connecting arm pivotally connected to one of the arms of the U-shaped clamp and to the trailer and a depending link pivotally connected to the other arm of the U-shaped clamp and to the remaining depending arm of the longitudinally extending shaft.

CHARLES CALVIN HUNT.